United States Patent [19]

Lipeles et al.

[11] Patent Number: 4,752,462

[45] Date of Patent: Jun. 21, 1988

[54] PROCESS FOR FORMING BARIUM CALCIUM ALUMINATE DISPENSER CATHODE IMPREGNANTS

[75] Inventors: Russell A. Lipeles; Howard A. Katzman, both of Los Angeles, Calif.

[73] Assignee: The Aerospace Corporation, El Segundo, Calif.

[21] Appl. No.: 913,032

[22] Filed: Sep. 29, 1986

[51] Int. Cl.[4] .................................................. C01F 7/16
[52] U.S. Cl. ..................................... 423/600; 501/125
[58] Field of Search .......................... 423/600; 501/125

[56] References Cited

U.S. PATENT DOCUMENTS

| | | | |
|---|---|---|---|
| 4,471,070 | 9/1984 | Siefert et al. | 423/600 |
| 4,522,937 | 6/1985 | Yoo et al. | 423/600 |
| 4,542,112 | 9/1985 | Matsui et al. | 423/600 |

Primary Examiner—Patrick P. Garvin
Assistant Examiner—Paige C. Harvey
Attorney, Agent, or Firm—William J. Burke

[57] ABSTRACT

An improved process for fabricating barium calcium aluminum impregnants for dispenser cathodes is described. The resulting cathodes have improved lifetimes and reliability through the use of organometallic starting materials in the impregnant process.

9 Claims, No Drawings

PROCESS FOR FORMING BARIUM CALCIUM ALUMINATE DISPENSER CATHODE IMPREGNANTS

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

This invention relates generally to the field of dispenser cathodes, and specifically to processes used to make improved barium calcium aluminate impregnants for dispenser cathodes.

2. Prior Art

Currently, the processs for fabricating barium calcium aluminate impregnate for dispenser cathodes consists of first mixing together, in a powdered form, the starting materials barium carbonate, calcium carbonate, and aluminum oxide, and then calcining the mixture to drive off the carbon dioxide thereby forming the barium calcium aluminate or impregnant. In this prior art process, nonhomogeneous impregnants frequently result because complete mixing of the powdered starting materials is difficult and also because complete reaction of the starting materials does not always occur due to the relatively large grain size of the starting materials.

Furthermore, the impurity, sulfur, is introduced into the impregnant from the starting materials, thereby resulting in cathode poisoning with subsequent performance degradation.

The ground or powdered impregnant so formed is then placed in contact with the porous tungsten cathode where it is melted into the pores of the cathode at a temperature of approximately 1600° C. Most impregnants consist of two or three crystalling phases that have a relatively wide range between the solidus temperature (initial formation of a liquid phase) and the liquidus temperature (disappearance of the solid phase). This range of melting temperatures results in an impregnant that is nonhomogeneous and is deficient in the higher melting temperature phases. Thus, a substantial disadvantage of the prior art is that the composition of the impregnant can not be controlled during melting thereby resulting in undesirable variations in cathode performance.

SUMMARY OF THE INVENTION

It is an important object of the invention to form a reliable, reproducible and long-lived dispenser cathode by impregnating with a homogeneous, fine-grained, and high-purity barium calcium aluminate.

It is another object of the invention to form the improved barium calcium aluminate from organometallic starting materials.

It is yet another object of the invention to mix together the organometallic starting materials while they are in a liquid form thereby ensuring mixing at the atomic level.

It is yet another object of the invention to use organometallic starting materials that can be easily hydrolyzed to oxides. These starting materials may be alkoxides or 2,4 pentanedionates (acetyl acetonates) or salts of organic acids.

It is also another object of the invention to form a uniform melting cathode impregnant consisting of a metastable phase or phases.

DESCRIPTION OF THE PREFERRED EMBODIMENT

The process of the present invention is for the fabrication of high purity, fine grain and homogeneous barium calcium aluminate impregnants for dispenser cathodes used in traveling wave tubes (TWT). These superior aluminates or impregnants act to improve the processing of dispenser cathodes thereby resulting in more long-lived, reproducible and reliable cathode devices. Typically, a dispenser cathode is comprised of a porous tungsten matrix that is impregnated with the compound, barium calcium aluminate. The aforementioned impregnant is required to continuously dispense barium and barium oxide onto the cathode surface in order to lower the surface work function and increase thermionic emission. Reproducible operation critically depends on the composition and purity of the impregnant.

As indicated infra, the impregnant that is currently used is manufactured by mixing barium carbonate, calcium carbonate, and aluminum oxide powders. This mixture is then calcined at approximately 1200° C. to drive off the carbon dioxide and thereby form the barium calcium aluminate. This process often results in relatively inhomogeneous impregnants because complete mixing of the powdered starting materials is difficult, because complete reaction of the starting materials does not always occur due to the large grain size of the starting materials, and because the the impregnant usually does not consist of a single phase. Furthermore, sulfur, which results incathode poisoning, is introduced into the impregnant from the starting materials. The ground or powdered impregnant is placed in contact with the empty porous tungsten cathode and is melted into the pores at about 1600° C. Since the composition of the impregnant cannot be controlled during melting, variations in cathode performance can result.

Impregnants produced using the process of the present invention are an improvement over the prior art impregnants produced from carbonates for the reasons that: homogeneous, fine grain impregnants are produced; contamination by sulfur can be greatly reduced because the starting materials can be easily purified; cathode performance will be more reproducible because the composition of the melted impregnant is constant; and the average cathode lifetime will be increased due to more uniform manufacture.

An exemplary preferred embodiment of the process to produce the improved barium calcium aluminate is described. In the first step of the improved process, the solid starting materials or the barium, calcium and aluminum organometallics are each dissolved in organic solvents. Particular organometallic compounds and solvents are selected for high solbility to minimize the volume of solvent required in processing. Some useful organometallic compounds are alkoxides, 2,4 pentanedionates (or acetyl acetonates), and acetates of barium, calcium, and aluminum. In the preferred embodiment, the solutions of the barium, calcium, and aluminum were prepared:

(1) dissolve 1.12 g of barium isopropoxide, Ba(iC$_3$H$_7$)$_2$, into a solution of 50 ml methanol and 50 ml toluene, (2) dissolve 0.46 g of calcium acetate, Ca(Ac)$_2$H$_2$O, into 150 ml methanol while heating and stirring, (3) dissolve 0.72 g of aluminum isopropoxide, Al(i-OC$_3$H$_7$)$_3$, into 50 ml toluene.

At this point, the barium and aluminum organometallic starting materials are alkoxides, and the calcium acetate can react with the solvent to become an alkoxide. The prior art mole ratio, as used in the present preferred embodiment, of barium, calcium, and aluminum in a solvent solution is 5 moles of barium to 3 moles of calcium to 4 moles of aluminum.

The second step of the process comprises the adding together of the dissolved barium, calcium, and aluminum starting materials in a stirred beaker. The aluminum isopropoxide solution is added to the barium isopropoxide solution and the calcium acetate solution is added to the mixture. After the above addition, a solution of about 50 ml of methanol and 50 ml toluene is used to rinse the starting materials into the final solution. The mixed starting material solution is refluxed for approximately 10–60 minutes to react the mixture. At this point, all of the starting materials including the barium, aluminum, and calcium organometallics are alkoxides.

The next step of the improved process comprises the addition of water to the starting materials solution to completely hydrolyze the starting materials and form a fine barium calcium aluminate precipitate. In particular, 70 ml of water is added and the solution is heated to about 40° C. for about 2 hours to assure complete hydrolysis. Subsequently, the hydrolyzed mixture is heated between 55° to 70° C. to obtain a fairly dry powder of barium calcium aluminate.

The final step of the improved process comprises heating for about 4 hours within the approximate range of 425° to 450° C. to remove organics from the powder and at 800° to 1000° C., to more completely convert the powder to the oxide form of the barium calcium aluminate.

The melting point of the powdered impregnant as prepared by the new improved process is approximately 1580° C. plus or minus 5° C. whereas the melting point of the prior art carbonate-derived impregnant is 1630° C. plus or minus 65° C. The relatively narrow melting range and lower melting temperature of the impregnant from the improved process occurs because it is more homogeneous and consists of a lower melting metastable solid solution phase that cannot be obtained by the prior art process.

This improved process can be used for impregnants of any barium:calcium:aluminum ratio. Features of the improved process include the use of organometallic starting materials to make barium calcium aluminate impregnants, and also the use of these high purity, homogeneous, fine grain barium calcuim aluminates leading to improved reproducibility and lifetimes of dispenser cathodes.

From the foregoing description of a specific embodiment illustrating the fundamental features of the invention, it will now be apparent to those skilled in the art that the invention may be accomplished in a variety of forms without departing from the spirit and scope thereof. Accordingly, it is understood that the invention disclosed herein is a preferred embodiment thereof and that the invention is not to be limited thereby, but only by the appended claims.

What is claimed is:

1. An improved process for forming barium-calcium-aluminate impregnants for dispenser cathodes, comprising the steps of:
    a. dissolving barium, calcium, and aluminum organometallics, individually, into suitable organic solvents to form three solutions therewith, wherein the organic solvents are methanol, toluene or a mixture thereof, and wherein the gram atomic weight ratio of barium to calcium to aluminum in the solutions is approximately 5:3:4;
    b. mixing the solutions to form one solution;
    c. hydrolyzing said organometallic solution to precipitate a powder;
    d. drying the powder; and
    e. calcining the dried powder.

2. The improved process of claim 1 wherein the barium organometallic is a barium alkoxide.

3. The improved process of claim 1 wherein the barium organometallic is barium isopropoxide.

4. The improved process of claim 1 wherein the barium organometallic is barium 2,4-pentanedionate.

5. The improved process of claim 1 wherein the calcium organometallic is calcium acetate.

6. The improved process of claim 1 wherein the calcium organometallic is calcium 2,4-pentanedionate.

7. The improved process of claim 1 wherein the aluminum organometallic is an aluminum alkoxide.

8. The improved process of claim 1 wherein the aluminum organometallic is aluminum isopropoxide.

9. The improved process of claim 1 wherein the aluminum organometallic is aluminum 2,4-pentanedionate.

* * * * *